United States Patent
Liu et al.

(10) Patent No.: US 9,210,468 B2
(45) Date of Patent: Dec. 8, 2015

(54) SYSTEM AND METHOD FOR EFFECTIVELY IMPLEMENTING A STROBOSCOPIC VISUAL EFFECT

(75) Inventors: Ming-Chang Liu, San Jose, CA (US); Kuang-Man Huang, San Jose, CA (US); Chuen-Chien Lee, Pleasanton, CA (US)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 13/065,445

(22) Filed: Mar. 22, 2011

(65) Prior Publication Data

US 2012/0242779 A1    Sep. 27, 2012

(51) Int. Cl.
| H04N 7/00 | (2011.01) |
| H04N 5/45 | (2011.01) |
| H04N 9/74 | (2006.01) |
| H04N 21/4402 | (2011.01) |
| H04N 5/14 | (2006.01) |
| H04N 5/783 | (2006.01) |
| H04N 21/431 | (2011.01) |
| H04N 5/262 | (2006.01) |

(52) U.S. Cl.
CPC ....... *H04N 21/440281* (2013.01); *H04N 5/145* (2013.01); *H04N 5/45* (2013.01); *H04N 5/783* (2013.01); *H04N 21/4312* (2013.01); *H04N 5/2625* (2013.01); *H04N 21/4316* (2013.01)

(58) Field of Classification Search
CPC ............ H04N 5/23238; H04N 5/2628; H04N 5/2259; H04N 5/232; G02B 13/06
USPC .............................. 348/36, 579, 565; 345/629
See application file for complete search history.

(56) References Cited

U.S. PATENT DOCUMENTS

| 3,885,217 | A | * | 5/1975 | Cintron | 375/269 |
| 4,249,212 | A | * | 2/1981 | Ito et al. | 348/579 |
| 5,012,328 | A | * | 4/1991 | Ishiguro | 348/560 |
| 5,045,946 | A | * | 9/1991 | Yu | 348/565 |
| 5,047,857 | A | * | 9/1991 | Duffield et al. | 348/553 |
| 5,093,726 | A | * | 3/1992 | Chun | 348/565 |
| 5,438,423 | A | | 8/1995 | Lynch et al. | |
| 6,411,339 | B1 | * | 6/2002 | Akutsu et al. | 348/584 |
| 6,665,342 | B1 | * | 12/2003 | Brown et al. | 375/240.16 |
| 6,856,757 | B2 | | 2/2005 | Dagtas | |

(Continued)

FOREIGN PATENT DOCUMENTS

JP      2007288802 A    11/2007

OTHER PUBLICATIONS

New and Enhanced Functionalities for the Popular SprintCam V3 HD Ultra-Slo-Motion Solution, I-Moix, http://www.i-movix.com/en/products/sprintcam-3-hd, 2009, 1-2 pages.

(Continued)

*Primary Examiner* — Jessica M Prince
*Assistant Examiner* — On S Mung
(74) *Attorney, Agent, or Firm* — Sony Corporation

(57) ABSTRACT

A system and method for effectively implementing a stroboscopic visual effect with a television device includes a strobe engine that analyzes video data to create a sequence of stroboscopic images based upon motion information from the video data. The television utilizes a display manager to present the stroboscopic images and the video data on a display device during a strobe display mode. A processor device of the television typically controls the operations of the strobe engine and the display manager to implement the stroboscopic visual effect.

18 Claims, 7 Drawing Sheets

(56) References Cited

U.S. PATENT DOCUMENTS

| | | | |
|---|---|---|---|
| 7,430,018 B1* | 9/2008 | Patel | H04N 13/0438 345/1.3 |
| 7,630,576 B2 | 12/2009 | Kondo | |
| 2003/0139666 A1* | 7/2003 | Klemm | A61B 1/2673 600/410 |
| 2003/0193690 A1* | 10/2003 | Inuiya | 358/1.15 |
| 2004/0017504 A1* | 1/2004 | Prandoni et al. | 348/370 |
| 2005/0262988 A1* | 12/2005 | Yurkovsky | G10G 7/02 84/455 |
| 2006/0209087 A1* | 9/2006 | Takeshima et al. | 345/629 |
| 2008/0175441 A1* | 7/2008 | Matsumoto et al. | 382/107 |
| 2009/0219300 A1* | 9/2009 | Peleg et al. | 345/630 |

OTHER PUBLICATIONS

VTR & Video Server Control System, DNF Controls, http://www.dnfcontrols.com/content/1155.jsp, Sep. 1, 2002, 1-6 Pages.

* cited by examiner

SYSTEM AND METHOD FOR EFFECTIVELY IMPLEMENTING A STROBOSCOPIC VISUAL EFFECT

BACKGROUND SECTION

1. Field of the Invention

This invention relates generally to techniques for displaying image data, and relates more particularly to a system and method for effectively implementing a stroboscopic visual effect.

2. Description of the Background Art

Implementing effective methods for displaying image data is a significant consideration for designers and manufacturers of contemporary electronic systems. However, effectively displaying image data may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced image display operations may provide additional benefits to a system user, but may also place increased demands on the control and management of various system components. For example, an enhanced electronic system that effectively performs advanced image display procedures may benefit from an efficient implementation because of the large amount and complexity of the digital data involved.

Due to growing demands on system resources and substantially increasing data magnitudes, it is apparent that developing new techniques for performing image display procedures is a matter of concern for related electronic technologies. Therefore, for all the foregoing reasons, developing effective systems for displaying image data remains a significant consideration for designers, manufacturers, and users of contemporary electronic systems.

SUMMARY

In accordance with the present invention, a system and method are disclosed for effectively implementing a stroboscopic visual effect with an electronic device. In accordance with one embodiment of the present invention, a television device includes a strobe engine that analyzes video data to create a sequence of stroboscopic images based upon motion information from the video data. The motion information is locally stored in a strobe buffer memory of the television. The television may then utilize a display manager to present the stroboscopic images and the video data together on a television display during a strobe display mode that is locally controllable by a television user. A processor device of the television typically controls the operations of the strobe engine and the display manager to implement the stroboscopic visual effect.

In certain embodiments, the television supports a strobe picture-in-picture (PIP) mode during which a stroboscopic display may be displayed in a PIP window while other television programming is displayed on the main screen of the display. Alternately, a stroboscopic display may be displayed on the main screen area while other television programming is displayed inside of the PIP window. In certain embodiments, the television may also support a strobe panorama mode during which a stroboscopic display may be displayed as a still panorama of sequential stroboscopic images. This still panorama image can be displayed as whole or gradually panning by following the object moving direction or by viewer's preference. For all of the foregoing reasons, the present invention therefore provides an improved system and method for effectively implementing a user-controllable stroboscopic visual effect on an electronic device.

DETAILED DESCRIPTION

The present invention relates to an improvement in image display systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing a stroboscopic visual effect with a television device, and may include a strobe engine that analyzes video data to create a sequence of stroboscopic images based upon motion information from the video data. The television then utilizes a display manager to present the stroboscopic images and the video data on a display device during a strobe display mode that is locally controllable by a television user. A processor device of the television typically controls the operations of the strobe engine and the display manager to implement the stroboscopic visual effect.

Figure 1:
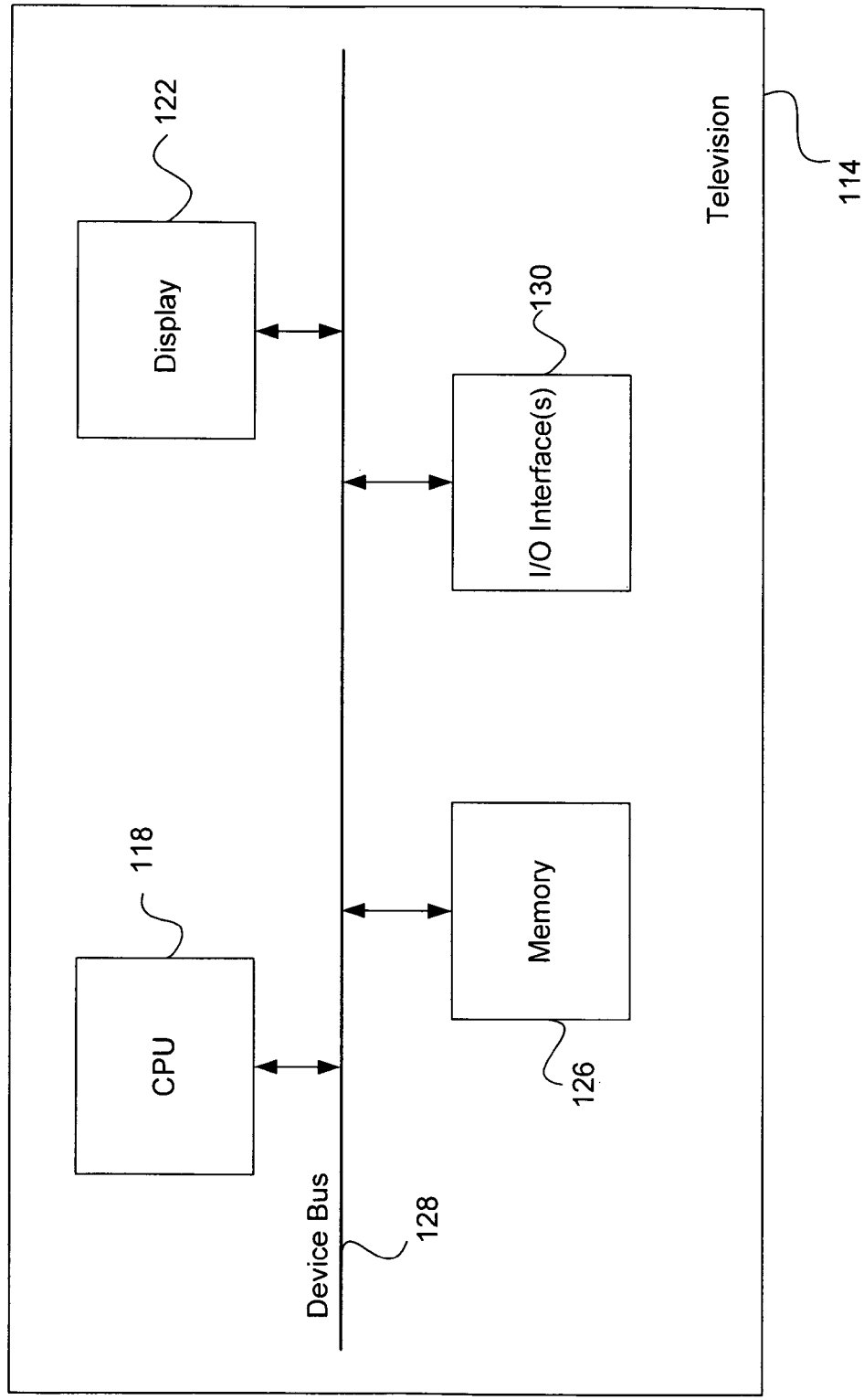
FIG. 1 is a block diagram of a television, in accordance with one embodiment of the present invention.

Referring now to FIG. 1, a block diagram for one embodiment of a television 114 is shown, in accordance with the present invention. In the FIG. 1 embodiment, television 114 may include, but is not limited to, a central processing unit (CPU) 118, a display 122, a memory 126, and input/output interfaces (I/O interfaces) 130. Selected ones of the foregoing components of television 114 may be coupled to, and communicate through, a device bus 128.

In alternate embodiments, television 114 may be implemented using components and configurations in addition to, or instead of, certain of those components and configurations discussed in conjunction with the FIG. 1 embodiment. In addition, television 114 may alternately be implemented as any other desired type of electronic device or entity. For example, television 114 may be implemented as a settop box, a personal digital assistant, a cellular telephone, a digital camera, or a personal computer.

In the FIG. 1 embodiment, CPU 118 may be implemented to include any appropriate and compatible microprocessor device that executes software instructions to thereby control and manage the operation of television 114. The FIG. 1 embodiment, display 122 may include any effective type of display technology including a cathode-ray-tube monitor or a liquid-crystal display device with an appropriate screen for displaying various information to a device user.

In the FIG. 1 embodiment, memory 126 may be implemented to include any combination of desired storage devices, including, but not limited to, read-only memory (ROM), random-access memory (RAM), and various types of non-volatile memory, such as floppy disks or hard disks. The contents and functionality of memory 126 are further discussed below in conjunction with FIG. 2. In the FIG. 1 embodiment, I/O interfaces 130 may include one or more input and/or output interfaces to receive and/or transmit any required types of information for television 114. For example, in certain embodiments, I/O interfaces 130 may include a wireless remote control device that a television user may utilize to control any desired functionalities of a strobe display mode of television 114. Additional details regarding the implementation and utilization of television 114 are further discussed below in conjunction with FIGS. 2 through 7.

Figure 2:
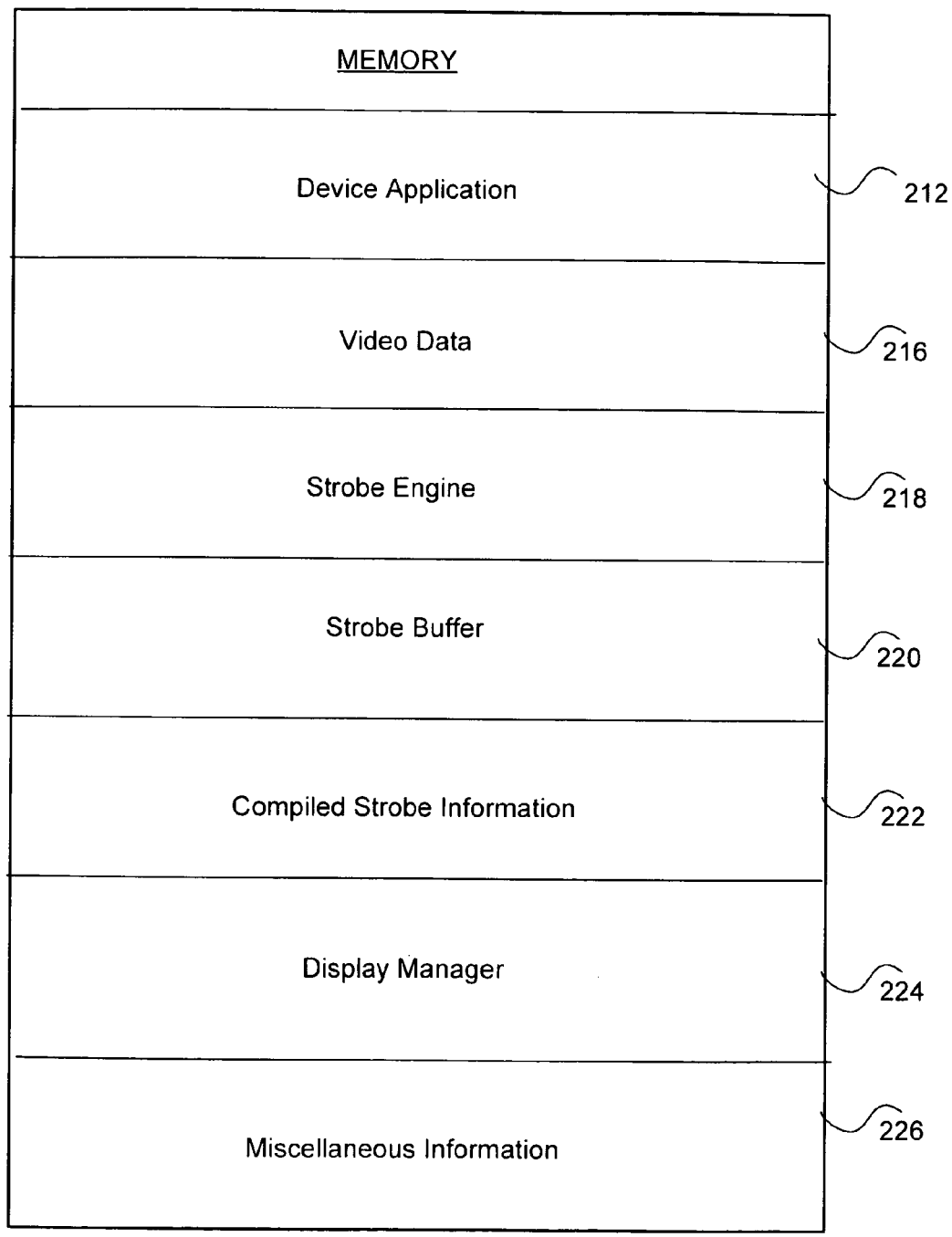
FIG. 2 is a block diagram for one embodiment of the memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 includes, but is not limited to, a device application 212, video data 216, a strobe engine 218, a strobe buffer 220, compiled strobe information 222, a display manager 224, and miscellaneous information 226. In alternate embodiments, memory 126 may include components and functionalities in addition to, or instead of, certain of those components and functionalities discussed in conjunction with the FIG. 2 embodiment.

In the FIG. 2 embodiment, device application 212 may include program instructions that are preferably executed by CPU 118 (FIG. 1) to perform various functions and operations for television 114. The particular nature and functionality of device application 212 typically varies depending upon factors such as the specific type and particular functionality of the corresponding television 114. In the FIG. 2 embodiment, video data 216 may include any appropriate type of video information received in any format from any video source.

In the FIG. 2 embodiment, television 114 may utilize strobe engine 218 and display manager 224 to control and present a strobe display mode, in accordance with any effective techniques or methods. In the FIG. 2 embodiment, strobe buffer 220 may be utilized by strobe engine 218 store sequential sets of motion information derived from the video data 216. Similarly, compiled strobe information 222 may include combinations of the stored motion information from strobe buffer 220. The compiled strobe information 222 may then be combined with the video data 216 by display manager 224 to display a stroboscopic visual effect on television 114. In the FIG. 2 embodiment, miscellaneous information 226 may include any type of other data or software instructions for use by television 114. For example, miscellaneous information 226 may include strobe mode parameters that are automatically selected by strobe engine 218 or manually selected by a television user for controlling the strobe display mode. In certain embodiments, the strobe mode parameters may include, but are not limited to, a strobe frequency value that defines the rate of stroboscopic images and a strobe persistence value that defines how long the stroboscopic images are displayed on television 114.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the implementation and utilization of the strobe display mode are further discussed below in conjunction with FIGS. 3 through 7.

Figure 3:
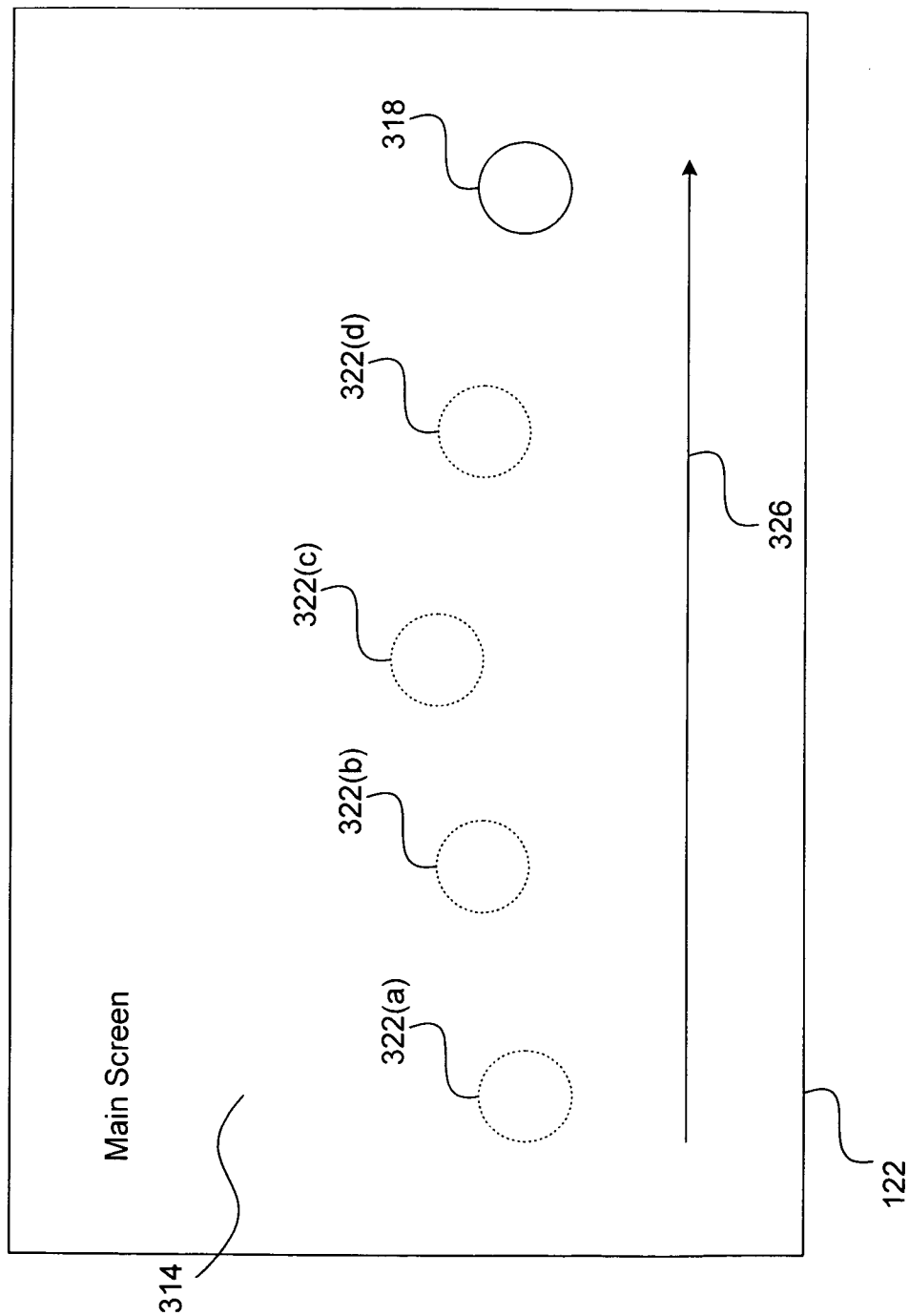
FIG. 3 is a diagram illustrating a strobe display mode for the television of FIG. 1, in accordance with one embodiment of the present invention.

Referring now to FIG. 3, a diagram for illustrating a basic strobe display mode for the FIG. 1 television 114 is shown, in accordance with one embodiment of the present invention. The FIG. 3 embodiment is presented for purposes of illustration, and in alternate embodiments, strobe display modes may be generated using configuration and techniques in addition to, or instead of, certain of those configurations techniques discussed in conjunction with the FIG. 3 embodiment.

In the FIG. 3 example, the display 122 of television 114 (FIG. 1) is depicted with a main screen area 314. In order to illustrate the basic strobe display mode, display 122 shows the trajectory of a ball that is traveling from left to right in the direction of arrow 326. The FIG. 3 example portrays a series of four prior stroboscopic images 322 proceeding from left to right, followed by a current real-time image 318 at the far right of display 122. In practice, the stroboscopic images of FIG. 3 would typically occur at periodic time intervals beginning with stroboscopic image 322($a$), followed sequentially by stroboscopic images 322($b$), 322($c$), 322($d$), and finally real-time image 318.

In alternate embodiments, any direction of motion and/or speed of motion are equally contemplated for the strobe display mode. Furthermore, a strobe frequency may be selected to produce a greater or lesser number of stroboscopic images. In the FIG. 3 embodiment, assuming that the target object (here, the ball) continues its trajectory and the camera is panned to follow the ball, the current ball 318 will then be converted into a stroboscopic image 322 so that a new current real-time ball 318 may be displayed. In accordance with the present invention, a television user may manually initiate, control, and terminate the strobe display mode on television 114 in any effective manner.

Although the FIG. 3 example utilizes a ball in flight for purposes of illustration, any other desired photographic target object having motion characteristics is equally contemplated for the strobe display mode. For example, an appropriate photographic target object may include, but is not limited to, a bicyclist, a flying bird, a runner, a rocket, an automobile, an athlete, running animal, a dancer, an airplane, etc. Additional details regarding the implementation of strobe display modes are further discussed below in conjunction with FIGS. 4 through 7.

Figure 4:
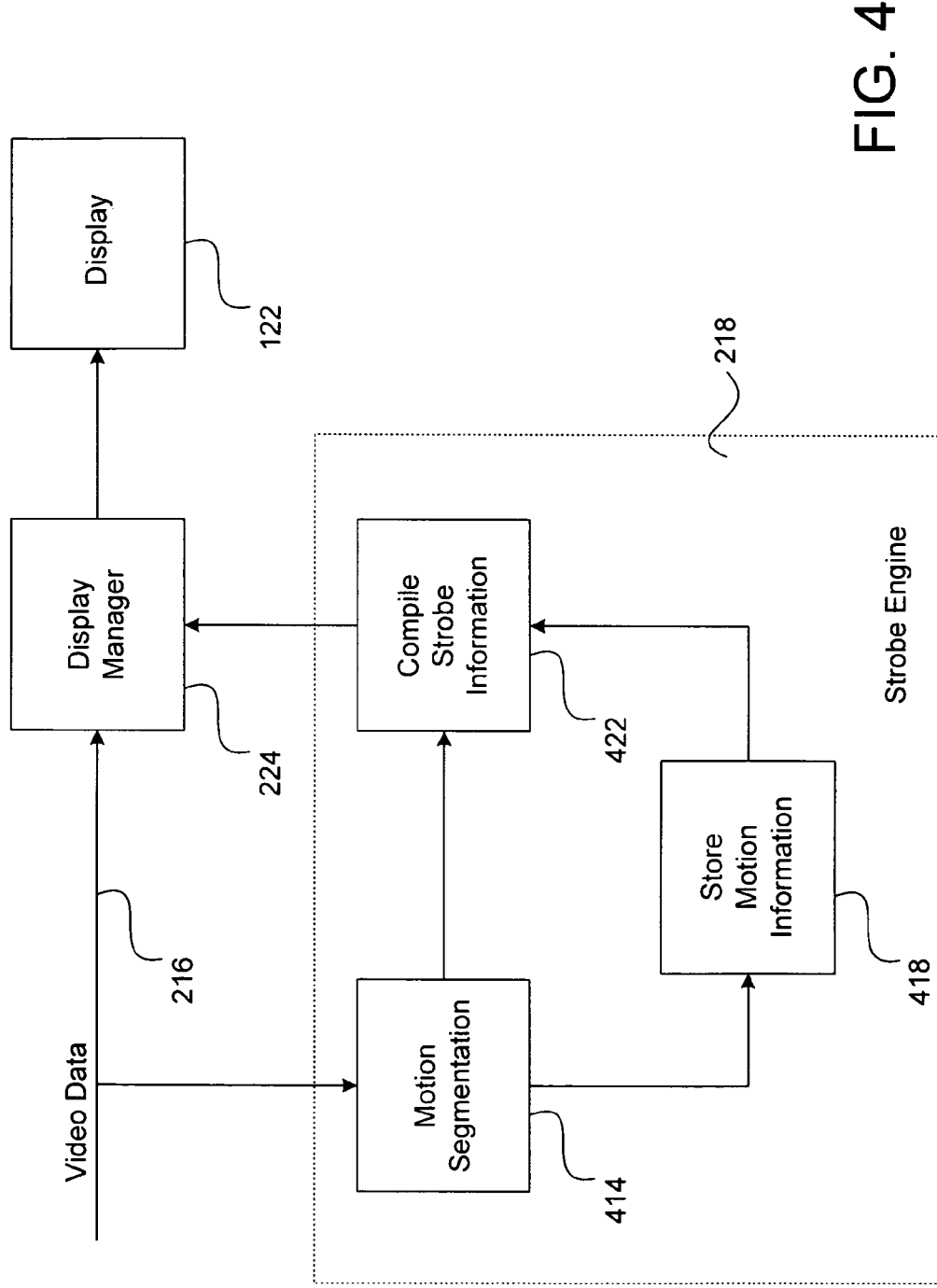
FIG. 4 is a block diagram for implementing the strobe display mode of FIG. 3, in accordance with one embodiment of the present invention.

Referring now to FIG. 4, a block diagram for implementing the FIG. 3 strobe display mode is shown, in accordance with one embodiment of the present invention. The FIG. 4 embodiment is presented for purposes of illustration, and in alternate embodiments, strobe display modes may be implemented using techniques in addition to, or instead of, certain of those techniques discussed in conjunction with the FIG. 4 embodiment.

In the FIG. 4 embodiment, video data 216 is initially received by a television 114 (FIG. 1) from any appropriate video source. The video data 216 is provided to both a display manager 224 and to a strobe engine 218 of television 114. In the FIG. 4 embodiment, the strobe engine 218 performs motion segmentation procedures 414 upon the received video data 216 to sequentially produce and store 418 corresponding motion information in a strobe buffer 220 (see FIG. 5).

In the FIG. 4 embodiment, strobe engine 218 may then utilize the stored motion information to create 422 compiled strobe information 222 (FIG. 2) that represents a combination of individual sets of the stored motion information. In the FIG. 4 embodiment, a display manager 224 of television 114 may then combine the video data 216 and the compiled strobe information 222 for creating a stroboscopic visual effect during a strobe display mode on television 114. Additional details regarding various techniques for implementing strobe display modes are further discussed in U.S. patent application Ser. No. 12/829,716 entitled "Tail The Motion Of Generating Simulated Strobe Motion Videos And Pictures Using Image Cloning," filed on Jul. 2, 2010, which is hereby incorporated by reference.

Figure 5:
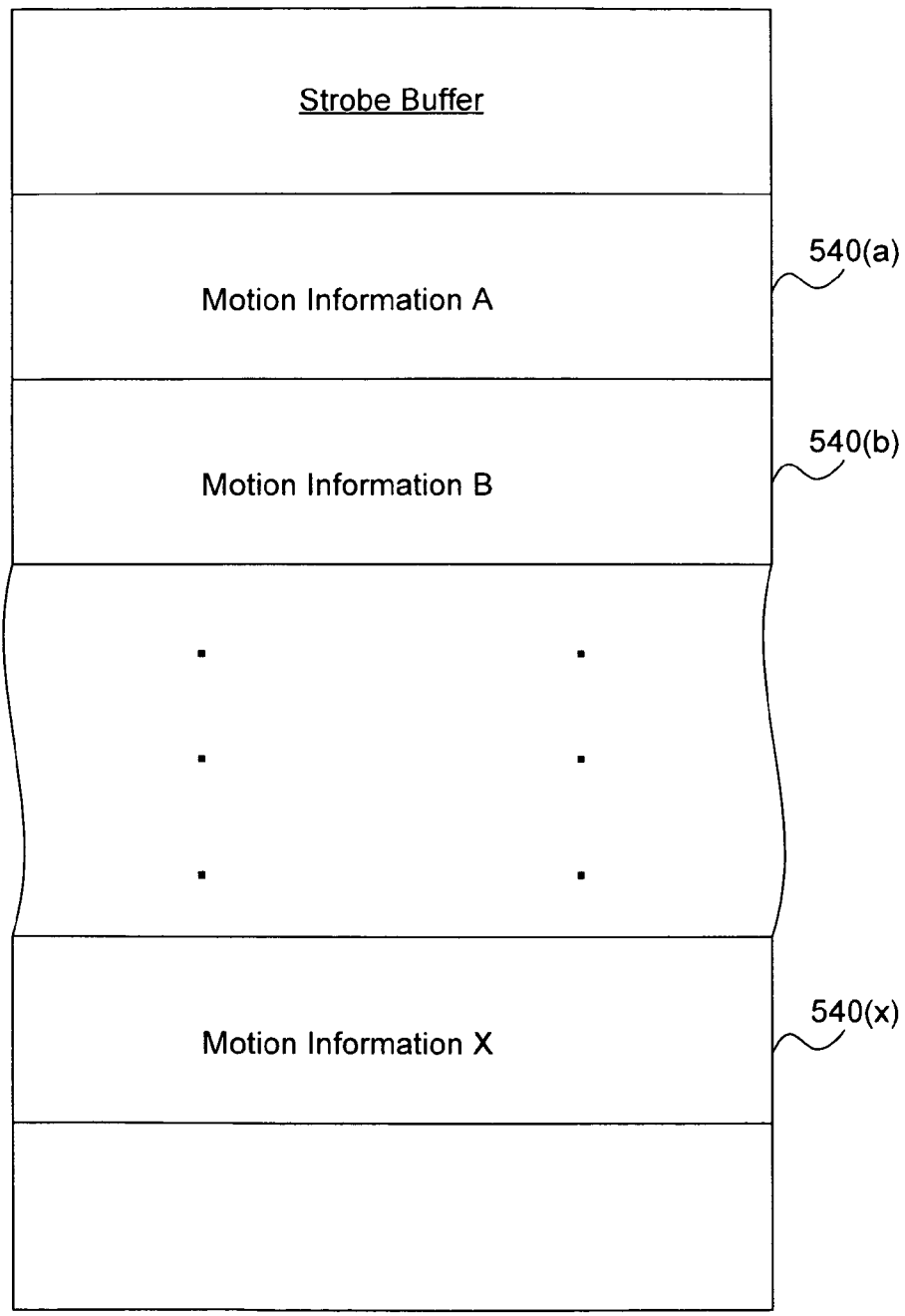
FIG. 5 is a block diagram for one embodiment of the strobe buffer of FIG. 2, in accordance with the present invention.

Referring now to FIG. 5, a diagram showing the FIG. 2 strobe buffer 220 is shown, in accordance with one embodiment of the present invention. The FIG. 5 example is presented for purposes of illustration, and in alternate embodiments, strobe buffer 220 may be implemented using configurations in addition to, or instead of, certain of those configurations discussed in conjunction with the FIG. 5 embodiment.

In the FIG. 5 embodiment, strobe buffer 220 includes a series of sets of motion information 540, as discussed above in conjunction with FIG. 4. In particular, the FIG. 5 embodiment includes motion information set A 540(a) through motion information set X 540(x). However, any other quantity of motion information sets 540 is equally contemplated. In the FIG. 5 embodiment, strobe engine 218 creates each set of motion information 540 in a temporal sequence that is related to a strobe frequency of the strobe display mode. For example, strobe engine 218 may generate the motion information 540 based upon a temporal relationship with a frame rate of the video data 216. In certain embodiments, each set of motion information 540 may correspond to a different one of the stroboscopic images 322 from the strobe display mode (see FIG. 3). In the FIG. 5 embodiment, motion information 540 in strobe buffer 220 may be constantly updated by strobe engine 218 to reflect the most current motion information in video data 216.

Figure 6:
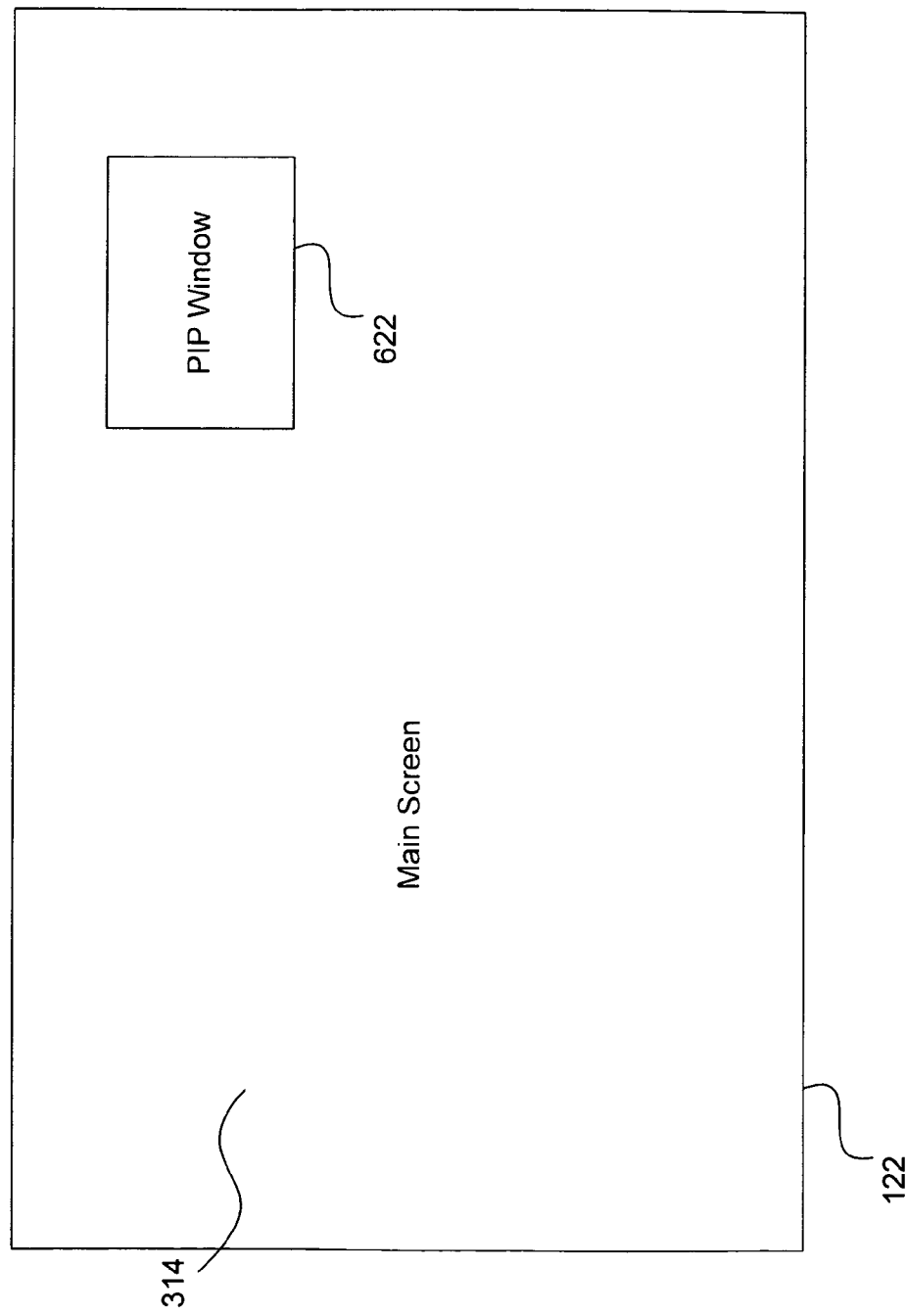
FIG. 6 is a diagram illustrating a strobe picture-in-picture mode for the television of FIG. 1, in accordance with one embodiment of the present invention.

Referring now to FIG. 6, a diagram illustrating a strobe picture-in-picture (PIP) mode is shown, in accordance with one embodiment of the present invention. The FIG. 6 example is presented for purposes of illustration, and in alternate embodiments, strobe PIP modes may be implemented using techniques in addition to, or instead of, certain of those techniques discussed in conjunction with the FIG. 6 embodiment.

In the FIG. 6 embodiment, display 122 of television 114 (FIG. 1) is shown with a main screen area 314 and a picture-in-picture (PIP) window 622. Under certain circumstances, a television user may wish to view a stroboscopic visual effect and primary television programming simultaneously. Accordingly, television 114 supports a strobe PIP mode during which a strobe display (such as FIG. 3) may be displayed in PIP window 622 while other television programming is displayed on main screen 314. Alternately, a stroboscopic display (such as FIG. 3) may be displayed on main screen 314 while other television programming is displayed inside of PIP window 622. In the FIG. 6 embodiment, a television user may initiate, control, or terminate the strobe PIP mode by utilizing any effective means including, but not limited to, a wireless remote control device.

Figure 7:
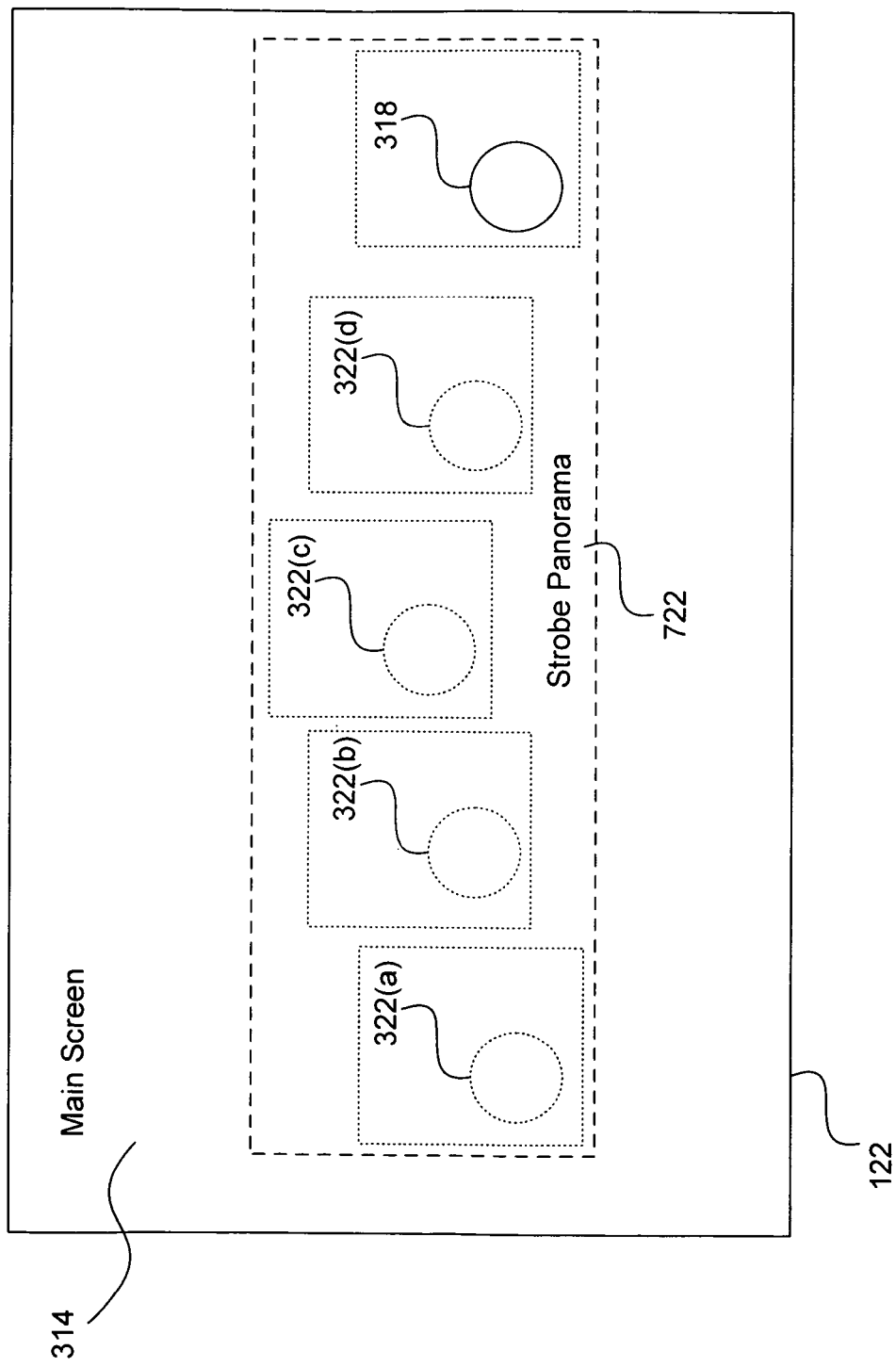
FIG. 7 is a diagram illustrating a strobe panorama mode for the television of FIG. 1, in accordance with one embodiment of the present invention.

Referring now to FIG. 7, a diagram illustrating a strobe panorama mode is shown, in accordance with one embodiment of the present invention. The FIG. 7 example is presented for purposes of illustration, and in alternate embodiments, strobe panorama modes may be implemented using techniques in addition to, or instead of, certain of those techniques discussed in conjunction with the FIG. 7 embodiment.

In the FIG. 7 embodiment, display 122 of television 114 (FIG. 1) is shown with a main screen area 314 that presents a strobe panorama image 722. In the FIG. 7 embodiment, strobe panorama image 722 provides a still image of the stroboscopic visual effect shown above in conjunction with FIG. 3. In alternate embodiments, any other desired sequence or subject matter is equally contemplated. For example, this still panorama image can be displayed as whole or gradually panning by following the object moving direction or by viewer's preference.

Under certain circumstances, a television user may wish to view a still version of a stroboscopic visual effect. Accordingly, television 114 supports a strobe panorama mode during which a live strobe display (such as FIG. 3) may be displayed as a still image of sequential stroboscopic images. In certain embodiments, the strobe panorama 722 may be displayed in conjunction with television programming, basic strobe display (FIG. 3), and/or a strobe PIP window 622 (FIG. 6). In the FIG. 7 embodiment, a television user may readily initiate, control, or terminate the strobe panorama mode by utilizing any effective means including, but not limited to, a wireless remote control device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing a stroboscopic visual effect with an electronic device, comprising:
    a strobe engine that:
        analyzes video data to create stroboscopic images by referencing strobe mode parameters for controlling a strobe display mode, and
        performs a motion segmentation procedure upon said video data to produce corresponding sets of motion information,
        wherein said strobe mode parameters are manually selected by a device user of said electronic device,
        wherein said strobe mode parameters including comprise a strobe frequency value that defines a display rate of said stroboscopic images, and
        wherein each of said sets of motion information is related to a strobe frequency of said strobe display mode;
    a display manager that presents said stroboscopic images, said video data, and said corresponding sets of motion information on a display device during said strobe display mode; and
    a processor device that controls said strobe engine and said display manager.

2. The system of claim 1, wherein said electronic device is implemented as a television device that is a stand-alone device without peripheral devices.

3. The system of claim 1, wherein said strobe engine analyzes said video data to produce motion information corresponding to said stroboscopic images.

4. The system of claim 3, wherein said strobe engine sequentially stores said motion information as said sets of motion information into a strobe buffer of said electronic device.

5. The system of claim 4, wherein said strobe buffer utilizes sequential sets of said motion information from said strobe buffer to create compiled strobe information.

6. The system of claim 1, wherein said strobe display mode displays a current real-time image and a sequence of said stroboscopic images that occur in a temporal motion sequence corresponding to a photographed target object.

7. The system of claim 1, wherein said strobe display mode includes a strobe picture-in-picture mode during which said display includes a main screen area and a picture-in-picture window area.

8. The system of claim 7, wherein said strobe picture-in-picture mode displays said stroboscopic visual effect in said picture-in-picture window area and displays television programming in said main screen area.

9. The system of claim 7, wherein said strobe picture-in-picture mode displays said stroboscopic visual effect in said main screen area and displays television programming in said picture-in-picture window area.

10. The system of claim 1, wherein said strobe display mode includes a strobe panorama mode during which said display includes a strobe panorama image based on motion characteristics of a photographed target object.

11. The system of claim 10, wherein said strobe panorama image is a still image that includes said stroboscopic images.

12. The system of claim 10, wherein said strobe panorama image is displayed on said display along with at least one of a live stroboscopic image sequence or a picture-in-picture window area.

13. The system of claim 1, wherein said device user utilizes a wireless remote control device to configure and control various functionalities of said strobe display mode.

14. The system of claim 1, wherein said strobe engine performs said motion segmentation procedure upon said video data to produce said corresponding sets of motion information at periodic intervals.

15. The system of claim 14, wherein said strobe engine stores said corresponding sets of motion information into a strobe buffer memory of said electronic device.

16. The system of claim 15, wherein said strobe engine combines said corresponding sets of motion information from said strobe buffer memory into compiled strobe information.

17. The system of claim 16, wherein said display manager presents said video data together with said compiled strobe information on said display device during said strobe display mode.

18. A method for implementing a stroboscopic visual effect with an electronic device, by performing the steps of:
- analyzing video data with a strobe engine to create stroboscopic images by referencing strobe mode parameters for controlling a strobe display mode,
- performing a motion segmentation procedure with said strobe engine upon said video data to produce corresponding sets of motion information,
  - wherein said strobe mode parameters are manually selected by a device user of said electronic device,
  - wherein said strobe mode parameters comprise a strobe frequency value that defines a display rate of said stroboscopic images, and
  - wherein each of said sets of motion information is related to a strobe frequency of the strobe display mode;
- utilizing a display manager to present said stroboscopic images, said video data and corresponding sets of motion information on a display device during a strobe display mode; and
- controlling said strobe engine and said display manager with a processor device.

* * * * *